Jan. 18, 1927.  
W. E. GREENAWALT  
1,614,669  
COPPER EXTRACTION PROCESS  
Filed April 10, 1926
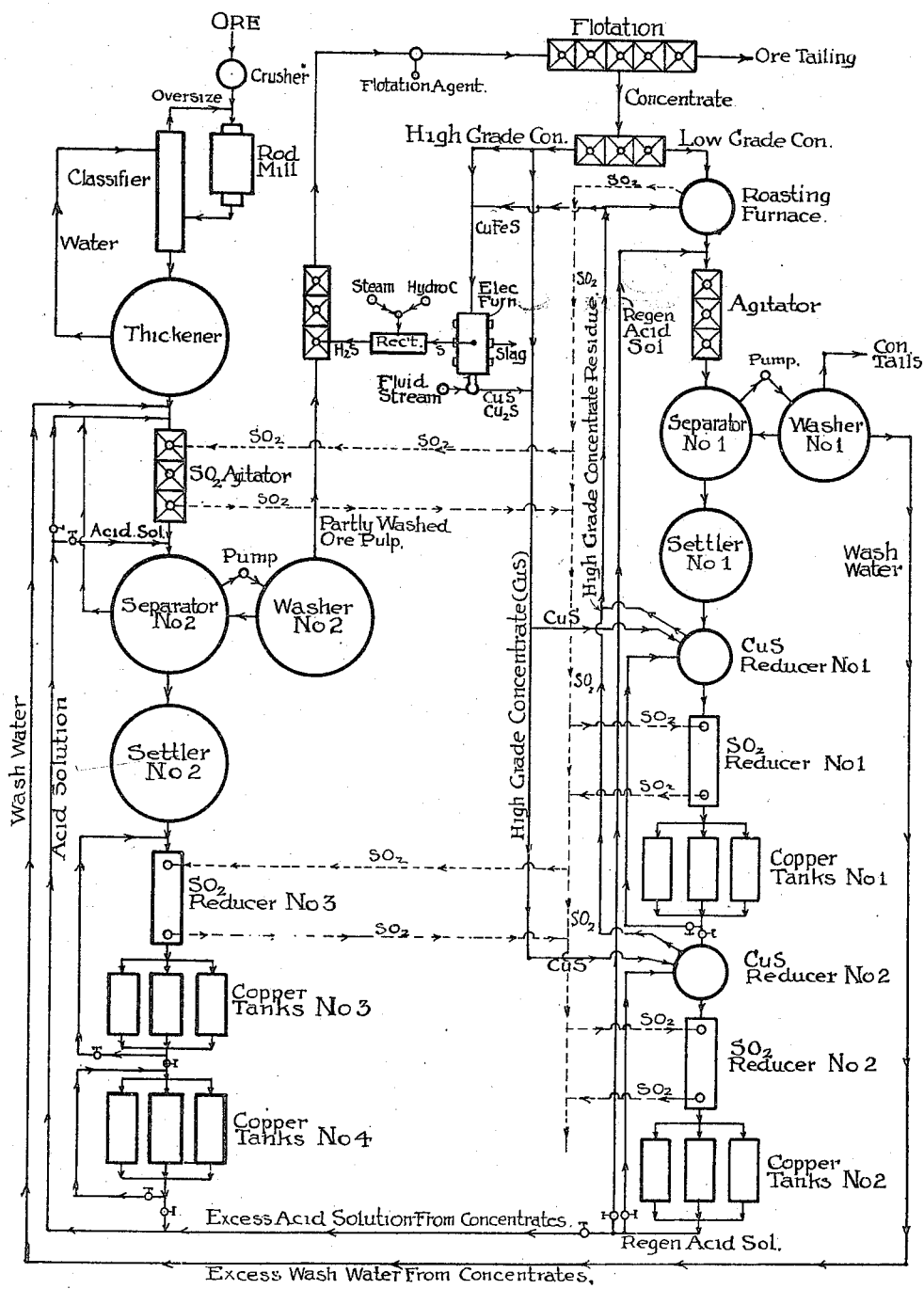
INVENTOR  
William E. Greenawalt Patented Jan. 18, 1927.

1,614,669

UNITED STATES PATENT OFFICE.

WILLIAM E. GREENAWALT, OF DENVER, COLORADO.

COPPER-EXTRACTION PROCESS.

Application filed April 10, 1926. Serial No. 101,194.

In leaching copper ore with an acid solution, such as sulphuric acid, iron is always dissolved with the copper. In the electrolysis of copper solutions containing salts of iron, copper is deposited while sulphuric acid and ferric sulphate are regenerated, as shown by the following equation:

$$CuSO_4 + 2FeSO_4 + \text{electrolysis} = Cu + xH_2SO_4 + yFe_2(SO_4)_3;$$

in which $x$ represents an indeterminate amount of sulphuric acid and $y$ an indeterminate amount of ferric sulphate. The relative amounts of acid and ferric sulphate produced by the electrolysis will largely depend on the details of operation. For example, lead anodes will give a relatively large amount of sulphuric acid with a relatively small amount of ferric sulphate, while carbon anodes will give a relatively large amount of ferric sulphate with a relatively small amount of sulphuric acid.

Ferric sulphate in the electrolyte is harmful; it re-dissolves deposited copper somewhat in proportion to its presence in the electrolyte. Ferrous sulphate is quite harmless, and may be beneficial. The crucial problem of the deposition of copper from solutions containing salts of iron, practically resolves itself to the control, or reduction, of the ferric iron produced in the deposition of the copper. There are a number of reducing agents available for this purpose, but only two—copper sulphide and sulphur dioxide—will be discussed in connection with this process.

The reduction of ferric iron becomes more difficult as the solution increases in acidity. Ferric sulphate is easily reduced in neutral or slightly acid solutions, while its effective reduction in highly acid solutions is very difficult. For this reason the solutions should not contain an excessive amount of acid unless a large amount of acid is desired for other purposes.

Sulphur dioxide is an effective reducing agent for ferric iron under some conditions if properly applied, as for example, as set forth in my Patents No. 1,353,995, Sept. 28, 1920, and No. 1,483,056, Feb. 5, 1924. If ferric iron is reduced with sulphur dioxide a large amount of acid is regenerated, as shown by the equation $$Fe_2(SO_4)_3 + SO_2 + 2H_2O = 2FeSO_4 + 2H_2SO_4.$$

Frequently such a regeneration of acid is desirable for leaching purposes.

If the ferric iron is reduced with copper sulphide, as set forth in some detail in my Patents, No. 1,340,826, May 18, 1920, No. 1,357,495, Nov. 2, 1920, and No. 1,489,121, Apr. 1, 1924, copper goes into solution with the simultaneous reduction of the ferric iron, while little or no acid is regenerated, as shown by the equations, $$Fe_2(SO_4)_3 + Cu_2S = CuSO_4 + CuS + 2FeSO_4$$

$$Fe_2(SO_4)_3 + CuS = CuSO_4 + 2FeSO_4 + S.$$

The copper sulphide may be either the natural sulphide, such as chalcocite, covellite, or chalcopyrite, a high grade copper matte as obtained from smelting, or a precipitate obtained by precipitating copper from lean and foul solutions with a sulphide precipitant such as hydrogen sulphide.

The application of sulphur dioxide to the leach solution, or electrolyte, is usually advantageous, but it will be seen that if the electrolysis is conducted in such a way as to generate a maximum amount of ferric iron and a minimum amount of acid, and the ferric iron is reduced with copper sulphide before the sulphur dioxide is applied, a considerable advantage would result over other methods of procedure, for the reason that copper would go into solution at the expense of the ferric iron and would be deposited as the electrolytic metal, while the solution would be maintained at a relatively low acidity, and the low acidity would result in a more effective reduction of the ferric iron with sulphur dioxide which is not reduced with copper sulphide. A wide range of operating conditions can thus be maintained by increasing or diminishing the variable factors of the process, such as the relative reduction of the ferric iron with copper sulphide and sulphur dioxide, the nature of the anodes, and the rate of circulation of the electrolyte and its temperature.

Carbon anodes, if they can be used, would regenerate a maximum amount of ferric iron and a minimum amount of acid. If carbon anodes are used it is desirable to have a hot electrolyte and vigorous circulation or agitation to facilitate depolarization, which appears to be essential for the preservation of carbon anodes and the generation of large quantities of ferric iron in the deposition of the copper from copper solutions containing salts of iron.

Ferric sulphate is a solvent for copper in its sulphide combinations, while sulphuric acid is not. It might be said that the hotter the solution of ferric sulphate the more effective it is as a solvent for copper in its sulphide combinations, and the more effective it is as a depolarizer in the deposition of the copper. Hot solutions are not always desirable, but under the conditions of this process hot solutions can be maintained and present certain advantages.

As another condition entering into the process in the treatment of sulphide concentrates, for example, roasting is an important matter. Under certain conditions of roasting it has been found that from 75% to 85% of the copper can be made soluble in water by roasting, and that a very high total extraction of the copper is possible with such a roast. But, with a large percentage of water soluble copper due to roasting, the amount of acid regenerated in the deposition of the copper should be maintained low for the most satisfactory operation, and the excess acid to be wasted, should be maintained as low as possible, unless oxidized ore is available for its use and neutralization, and oxidized ore is not always available in the treatment of sulphide concentrate.

When copper sulphide, either in the form of $CuS$, $Cu_2S$, or as a high grade matte is used for reduction purposes in the deposition of copper from leach solutions containing salts of iron the copper sulphide should be in an easily attackable condition by the ferric iron. The natural sulphide can be used for this purpose, but in view of the fact that the natural sulphide is usually very dense and almost always contaminated with other elements to present the best conditions for effective attack by ferric iron, it is preferred to first fuse the copper sulphide, partly to slag off some of the undesirable impurities and partly to convert the copper sulphide in a condition in which the copper is easily attacked by the solution, and in a form in which it is easily applied. If the natural copper sulphide is ground fine it is more effective than it is in a coarse condition, but the finely ground natural copper sulphide presents some undesirable qualities, such as its tendency to settle, difficulty in agitation, and clarification of the solution, and the increased time required for complete reaction. If, on the other hand, the copper sulphide is fused, and the fused copper sulphide is converted into the form of granules, shreds, or in the form of what is known as mineral wool, its application, both chemically and physically, is greatly simplified. In view of these considerations it is preferred, for the present process, to fuse the copper sulphide and then to subject the fused copper sulphide in a small stream to the action of a stream of fluid—preferably a stream of compressed air—to subdivide the copper sulphide or convert it into the form of mineral wool, granules, or dust, and then to apply the copper sulphide in this condition to the leach solution or electrolyte as a reducing agent for the ferric iron and to convert the copper of the copper sulphide into the electrolytic metal.

Hydrogen sulphide is an effective precipitation agent for copper from foul and lean copper solutions, and hydrogen sulphide can be cheaply produced and effectively applied by generating it in connection with the treatment of high grade copper concentrate.

Sulphur dioxide, under some conditions, is an effective solvent for copper from oxidized ore; it is also an effective reducing agent for ferric iron, especially in low acid solutions. The roasting of low grade sulphide copper concentrate may furnish the sulphur dioxide for these purposes.

The process will now be described somewhat in detail, reference being made to the accompanying drawing which is a flow sheet in diagramatic plan of the process.

The ore, which may be presumed to be a sulphide containing some oxides, is crushed and then passes to the rod mill where it is ground to the desired fineness, as determined by experience to be the best under the conditions. The finely ground ore and water, or ore pulp, issues from the rod mill and flows into the classifier. The oversize is returned to the rod mill, while the ore crushed to the desired fineness flows from the classifier into the thickener, where some of the water of classification is removed and returned to the classifier. The thickened sludge then flows into the agitator where it is treated with sulphur dioxide obtained form roasting low grade copper concentrate or sulphide ore. The sulphur dioxide will combine with much of the undesirable impurities in the ore, such as lime, and with most of the easily soluble copper. Sometimes this treatment will be sufficient and give the extraction of the oxidized copper desired. But as considerable acid is regenerated in other steps of the treatment, it is desirable at times to treat the ore with the regenerated acid to get a closer extraction than is possible by using sulphur dioxide alone. This acid may be added to the ore pulp as it flows into the separator No. 2, where most of the copper solution is separated from the gangue. The gangue is then given a slight washing, and the wash water from the slight washing may be added to the leach copper solution. The soluble copper remaining in the partly washed gangue or residue is then treated to precipitate the copper. Hydrogen sulphide is the preferred precipitant; this gives the copper precipitate in the residue in the form of copper sulphide, which is substantially the same form as the natural sulphides occurring in the ore, and may be similarly treated.

The leached ore residue is then mixed with a flotation agent and the sulphides are separated from the gangue by flotation, or by gravity if effective, or by both gravity and flotation combined. The barren gangue is wasted, or eliminated from further treatment by the present process.

The copper sulphide concentrate is divided into a high grade and a low grade concentrate, and given somewhat separate treatment.

In the concentration treatment of copper ore, either by gravity or flotation or both, a certain amount of very high grade concentrate may be separated from the large amount of ordinary sulphide concentrate, but the relatively small amount of very high grade concentrate will contain a relatively large portion of the total copper. Usually this relatively small portion of high grade concentrate will be in the form of chalcocite, with probably relatively small amounts of bornite and chalcopyrite, which will contaminate the high grade concentrate with a small amount of iron, but not enough to seriously affect the present process.

The copper in what is known as porphyry, or disseminated, deposits, is largely in the form of chalcocite, $Cu_2S$, and contains, theoretically, 79.8% copper and 20.2% sulphur.

The conditions of concentration can best be illustrated by taking a specific case in the treatment of 100 tons of ore assaying 1.5%, or 30 pounds of copper per ton, or containing a total of 3000 pounds of copper. If the ratio of concentration is 10 into 1, the result of the concentration treatment would be about as follows:

90 tons tailing 0.25% copper (5 lbs.) 450 lbs. total.

10 tons concentrate 12.75% copper (255 lbs.) 2550 lbs. total.

The ten tons of concentrate may then be separated into:

1.5 tons high grade concentrate, 50% copper (1000 lbs.) 1500 lbs. total.

8.5 tons low grade concentrate, 6.2% copper (124 lbs.), 1050 lbs. total.

Or, possibly, into the following.

1.0 ton high grade concentrate, 60% copper (1200 lbs.), 1200 lbs. total.

9.0 tons low grade concentrate, 7.5% copper (150 lbs.), 1350 lbs. total.

There should be no difficulty in making a relatively small amount of high grade concentrate, if much of the copper in the ore is in the form of chalcocite. For a 50% copper concentrate, there would be a margin of 29.8% of the theoretical; and for a 60% copper concentrate, there would be a margin of 19.0% of the theoretical. The latter is preferred and will be assumed for illustration, altho it will be understood that the process is not particularly limited to the percentage of copper in the high grade concentrate but that the higher the grade of the concentrate the better the process can be operated. A ton of 60% copper concentrate would contain, approximately, copper, 1200 pounds; sulphur, 400 pounds; impurities, 400 pounds. The impurities may be assumed to be mostly iron, with its combined sulphur, silica, alumina, and combined oxygen.

If there is gold or silver in the ore, the high grade concentrate will contain the precious metals in about the same proportion as it contains the copper from the original ore. That is to say, of the total precious metal content in the concentrate, 47.5% will be in the one ton of 60% copper concentrate, and 52.5% will be in the 9.0 tons of low grade concentrate assaying 7.5% copper.

Having made the separation of the mineral from the gangue and divided the mineral into a relatively small amount of high grade concentrate and a relatively large amount of low grade concentrate the method of procedure is as follows:

The low grade concentrate is roasted so as to convert as much as possible of the copper into sulphate, which is soluble in water and which makes possible a high extraction of the copper from the roasted low grade concentrate by water and acid leaching, and on electrolysis, supplies the necessary acid for the process. The roasted low grade concentrate is leached with a dilute acid solution to extract the copper, and the resulting copper solution, containing salts of iron, is then electrolyzed to deposit the copper, while at the same time acid and ferric iron are regenerated. Ferric iron in the electrolyte is harmful. It redissolves copper from the cathode approximately in proportion to its presence in the electrolyte. When the ferric iron in the electrolyte reaches 0.5% the deposition of the copper becomes inefficient, and when it reaches 0.75% to 1.0% the process practically becomes prohibitive. For good work, the solution flowing into the copper depositing tanks should be as low in ferric iron as possible, and the solution issuing from the copper depositing tanks should not greatly exceed 0.25% ferric iron. It may advantageously be less. The ferric iron produced by the deposition of the copper, may advantageously be reduced either with copper sulphide in any of its various forms, or with sulphur dioxide, or by both. For the purpose of this process it is preferred to reduce a portion of the ferric iron with the concentrated copper sulphide, or the high grade concentrate, consisting largely of $Cu_2S$ or $CuS$, obtained as a precipitate or occurring naturally in the ore, and then treat the solution with sulphur dioxide, preparatory to depositing the copper. Copper sulphide in a finely divided condition is an effective reducing agent for ferric iron, while at the same time an equivalent of copper goes into solution, as set forth in some detail in my Patents No. 1,365,034, Jan. 11, 1921; No. 1,357,495, Nov. 2, 1920; and No. 1,489,121, April 1, 1924. There is, however an advantage in first treating the electrolyzed solution containing ferric iron with copper sulphide and then with sulphur dioxide, at least in many cases, for the reason that with copper sulphide no acid is regenerated in the reduction and copper is taken into solution, and the treatment of the reduced or partly reduced solution with sulphur dioxide appears to be beneficial in the electrolysis in giving a better efficiency and a more reguline deposit. It also acts as a reducing agent in the event that the ferric iron is not entirely reduced with the copper concentrate, consisting largely of $Cu_2S$ or $CuS$.

It is preferred to electrolyze the copper solution, obtained from leaching the roasted low grade concentrate, in steps. If, for example, the rich copper solution from the roasted low grade concentrate contains 4.0% copper and it is desired to impoverish it down to 2.0% before returning the solution to the roasted concentrate, it is preferred to do it in two or more electrolytic units, each comprising a CuS reducer, an $SO_2$ reducer, and an electrolyzer or copper tank, by taking out 1.0% of the copper in the first electrolytic unit and 1.0% in the second, rather than to take out 2.0% of the copper in one unit. In the first case half of the copper would be deposited from a 3.0% copper solution and half from a 2.0% solution, while in the second case all of the copper would be deposited from approximately a 2.0% solution, and the conditions and the results would not be so good.

The unroasted high grade concentrate, consisting largely of $Cu_2S$ and $CuS$, obtained either as a precipitate or as the natural sulphide from the ore, is placed in the CuS reducers No. 1 and No. 2, in the desired amounts as determined by experience. The sulphur dioxide from the roasting furnace is conducted to the $SO_2$ reducers No. 1 and No. 2. The clarified solution from the roasted low grade concentrate is flowed through the CuS reducer No. 1, where ferric iron is reduced, and then through the $SO_2$ reducer No. 1, where the solution is treated with sulphur dioxide, and then to the copper tanks No. 1, where copper is deposited and an equivalent of acid and ferric iron regenerated. The solution, issuing from the copper tanks, containing say, from 0.10% to 0.24% ferric iron, is returned to the CuS reducer, where the ferric iron is reduced to the ferrous condition while an equivalent of copper goes into solution. The cycle is repeated and when the solution is reduced to about 3.0% copper from a head solution containing about 4.0%, a portion of the solution—the advance flow—is flowed to the second electrolytic unit where the cycle is repeated, while another portion is returned to the CuS reducer No. 1. An amount of fresh solution is added to the electrolytic circuit equivalent to that advanced from one electrolytic unit to the next. The solution from the second, or last electrolytic unit containing about 2.0% copper and some regenerated acid and ferric iron, is returned to the roasted low grade concentrate, while another portion is wasted, or used in leaching oxidized ore, if oxidized ore is available. In this way the copper solution from the treatment of the roasted high grade concentrate can always be maintained at a desired standard of purity or impurity.

In reducing ferric iron with copper sulphide as described, the efficiency of the process will depend somewhat on the nature of the copper sulphide and the extent of the impurities it contains. When the copper sulphide has been used for some time the impurities increase and its efficiency as a reducing agent becomes less, so that the copper sulphide residue is removed from time to time, as determined by experience, and the residue is roasted, either alone, but preferably, by simply mixing it with the low grade concentrate, and the residual copper of the copper sulphide or high grade concentrate is recovered with that of the roasted low grade concentrate.

In roasting the high grade copper sulphide concentrate, after some of the copper has been extracted from it in reducing ferric iron obtained by electrolyzing copper solutions containing iron, either alone or as a mixture with the low grade concentrate, the copper can be effectively extracted from the roasted material. If the roasted and leached residue contains precious metals, the material is put in excellent condition for the extraction of the precious metals, either by cyanidation or by chlorination. The application of copper sulphide concentrate, as obtained either as a precipitate, as chalcocite from the ore, or as obtained by fusion, as a reducing agent for ferric iron obtained by electrolysis of copper solutions, and the subsequent roasting and leaching of the copper sulphide residue, is set forth in some detail in my Patents No. 1,340,826, May 18, 1920; No. 1,357,495, Nov. 2, 1920; No. 1,489,121, April 1, 1924; No. 1,528,207, March 3, 1925, and in my pending application, Serial No. 60,577, October 5, 1925. The present process, in this respect, is a modification or improvement to accomplish the specific purpose set forth.

It sometimes happens that most of the copper in the ore in concentrated form, is in the minerals chalcopyrite, $CuFeS_2$, or bornite, $Cu_3FeS_3$, and will occur as such in the high grade concentrate. Chalcopyrite and bornite are not as readily acted upon as chalcocite, $Cu_2S$, or covellite, $CuS$, by ferric iron, and hence are not as effective either as a reducing agent for ferric iron, nor can the copper be as satisfactorily extracted from them. Under such conditions it is preferred to fuse or smelt the high grade concentrate in an electric furnace to drive off a large portion of the sulphur and slag off the iron and other impurities, so that the copper of the high grade concentrate will be converted wholly or partly into the form of $CuS$ or $Cu_2S$. It is desirable for effective work that the copper sulphide be in a finely divided condition to get the best results of reduction of the ferric iron and the solution of the copper from the sulphide concentrate. The fused copper sulphide may be crushed and ground fine in any fine grinding machine adapted to that purpose, but it is preferred to subdivide it by subjecting it to a fluid stream, such as a stream of water or a stream of compressed air or other gas, by means of which the molten copper sulphide is subdivided into fine particles, as granules, shreds, or dust, and the copper sulphide in this subdivided condition is light, open and porous, which makes it highly effective as a reducing agent for ferric iron with the simultaneous extraction of the copper.

When the high grade sulphide concentrate is heated in an electric furnace, in a reducing atmosphere, sulphur is volatilized as sulphur vapor. The first atom of sulphur from the chalcopyrite and bornite is driven off at a relatively low temperature, and $CuS$ is readily converted into $Cu_2S$ with liberation of sulphur. This sulphur vapor is converted into hydrogen sulphide, and the hydrogen sulphide so formed may be used to precipitate the copper from lean washwaters, foul solutions, and to precipitate the copper in soluble form in the ore pulp preparatory to flotation.

If steam or any hydrogen containing fluid is introduced into the electric furnace, hydrogen sulphide begins to form. Hydrogen sulphide begins to dissociate at about 400 deg. C., and increases with the rise in temperature. The temperature of the gases should not greatly exceed 500 deg. C. to get an efficient formation of hydrogen sulphide with the least amount of dissociation. To meet this condition, the gases escaping from the electric furnace are passed through the $H_2S$ rectifier, where the conditions for the maximum production of hydrogen sulphide can be controlled and regulated. The temperature may be maintained to get the maximum formation of hydrogen sulphide from the uncombined hydrogen and sulphur vapor, with the minimum amount of disintegration of hydrogen sulphide. In addition to the close regulation of temperature the rectifier may and usually will contain material which promotes the formation of hydrogen sulphide, such as glass or pumice, either of which appears to act as a catalyst. The rectifier may consist of a tube or chamber, containing a catalyst, such as pumice, which may be heated indirectly through the walls of the chamber, or directly by an electric current, to the desired temperature, or say, from 400 to 500 deg. C. The mixture of hydrogen sulphide, hydrogen, and sulphur vapor from the electric furnace is passed through the rectifier to combine the uncombined hydrogen with the uncombined sulphur vapor to form an equivalent of hydrogen sulphide. The gas is then used to precipitate the copper in the leached ore residue after leaching and preparatory to flotation.

In the fusion treatment of the high grade concentrate to still further concentrate it in copper, its effectiveness as a reducing agent for ferric iron is greatly increased. This implies that the copper of the fused concentrate is more quickly dissolved, that the ferric iron in the electrolyte is more quickly and effectively reduced, and that the copper is more economically converted into the electrolytic metal.

If the high grade copper concentrate consists largely, say of chalcocite, chalcopyrite and bornite, and very likely some pyrite, a portion of the sulphur of the sulphides is easily volatilized or dissociated, as for example, one atom of sulphur of the $CuS$ or $FeS_2$, composing the concentrate, the $CuS$ being converted into the $Cu_2S$ and the $FeS_2$ into the theoretical $FeS$. The liberated sulphur can be combined with hydrogen to form hydrogen sulphide, while the iron may be slagged off, so that the resulting product will be largely in the form of $Cu_2S$, which is very highly effective as a reducing agent for ferric iron. The residue of the high grade sulphide concentrate will contain the precious metals associated with the high grade concentrate. The residue of the high grade sulphide concentrate may be returned to the electric furnace if desired, until the residue is sufficiently enriched in the precious metals to warrant their separate recovery.

$Cu_2S$ or $CuS$ may be more effective than $SO_2$ in the reduction of ferric salts, especially if the copper sulphide is finely divided and the solution is heated. It is an advantage in this process to heat the solution above the normal temperature naturally due to the atmosphere or the reactions involved in the process, with heat supplied from an extraneous source. The reaction between copper sulphide and ferric iron increases with the rise in temperature, and as the amount of high grade concentrate to be treated is relatively small, the increment of heat from an external source, necessary to keep the solution at the desired temperature can be economically supplied.

It will be seen that if carbon anodes can be used with a high iron electrolyte a considerable saving can be effected, and the acidity of the solution can be easily controlled. The oxygen released at the anodes is largely or entirely consumed in converting ferrous iron to the ferric condition, and the ferric iron is again reduced by acting on the copper sulphide to bring copper into solution. The balance between the roasted concentrate and the unroasted concentrate can be easily maintained.

I claim:

1. A copper extraction process comprising, separating the ore into a high grade and a low grade copper concentrate, roasting the low grade concentrate, leaching the roasted low grade concentrate with a dilute acid solution to extract the copper, electrolyzing the resulting copper solution containing salts of iron to deposit the copper and regenerate acid and ferric iron, fusing the high grade concentrate and further concentrating it in copper by fusion, reducing the ferric iron formed by the electrolysis of the leach copper solution with said fused copper concentrate, and again electrolyzing the solution.

2. A copper extraction process comprising, separating copper ore into a high grade and a low grade copper concentrate, roasting the low grade concentrate, leaching the roasted low grade concentrate with a dilute acid solution to extract the copper, electrolyzing the resulting copper solution containing salts of iron to deposit the copper and regenerate acid and ferric iron, further concentrating the copper in the high grade concentrate by fusion, subdividing the high grade fused copper concentrate and applying it to the electrolyte to reduce ferric iron to the ferrous condition, and then again electrolyzing the solution.

3. A copper extraction process comprising, separating copper ore into a high grade and a low grade copper concentrate, roasting the low grade concentrate, leaching the roasted low grade concentrate with a dilute acid solution to extract the copper, electrolyzing the resulting copper solution containing salts of iron to deposit the copper and regenerate acid and ferric iron, further concentrating the high grade copper concentrate by fusion, subdividing the fused concentrate by subjecting it to the action of a fluid, reducing the ferric iron formed by the electrolysis with said subdivided high grade concentrate, and then again electrolyzing the solution.

4. A copper extraction process comprising, concentrating copper ore into a high grade and a low grade copper concentrate, roasting the low grade concentrate, leaching the roasted low grade concentrate with a dilute acid solution to extract the copper, electrolyzing the resulting copper solution containing salts of iron to deposit the copper and regenerate acid and ferric iron, fusing the high grade concentrate to still further concentrate it in copper by eliminating some of the sulphur and slagging off impurities, subdividing the resulting concentrate enriched in copper by fusion, applying the subdivided concentrate to the electrolyte obtained from leaching the roasted low grade concentrate as a reducing agent for the ferric iron produced by the electrolysis, and then again electrolyzing the solution.

5. A copper extraction process comprising, leaching copper ore with an acid solution to extract the copper, electrolyzing the resulting copper solution containing salts of iron to deposit the copper and regenerate acid and ferric iron, fusing a copper sulphide compound to enrich it in copper and then subjecting it to the action of a fluid stream to subdivide the enriched copper sulphide compound, and applying the subdivided copper sulphide compound to the electrolyte to reduce the ferric iron formed by the electrolysis to the ferrous condition.

6. A copper extraction process comprising, leaching copper ore with an acid solution to extract the copper, electrolyzing the resulting copper solution containing salts of iron to deposit the copper and regenerate acid and ferric iron, reducing a portion of the ferric iron so formed with copper sulphide and then another portion with sulphur dioxide, and then again electrolyzing the solution to deposit more copper.

7. A copper extraction process comprising, separating copper ore into a high grade and a low grade copper concentrate, roasting the low grade concentrate, leaching the roasted low grade concentrate with an acid solution to extract the copper, electrolyzing the resulting copper solution containing salts of iron to deposit the copper and regenerate acid and ferric iron, treating the electrolyte containing ferric iron with the high grade copper concentrate and then with sulphur dioxide, and then again electrolyzing the solution.

8. A copper extraction process comprising, separating copper ore into a high grade and a low grade copper concentrate, roasting the low grade concentrate, leaching the roasted low grade concentrate with an acid solution to extract the copper, electrolyzing the resulting copper solution containing salts of iron to deposit the copper and regenerate acid and ferric iron, treating the electrolyte containing ferric iron first with the high grade copper concentrate and then with sulphur dioxide, then again electrolyzing the solution and repeating the cycle until the solution is sufficiently impoverished in copper, and then returning the solution to the roasted low grade concentrate.

9. A copper extraction process comprising, separating copper ore into a high grade and a low grade copper concentrate, roasting the low grade concentrate, leaching the roasted low grade concentrate with an acid solution to extract the copper, electrolyzing the resulting copper solution containing salts of iron to deposit the copper and regenerate acid and ferric iron, treating the electrolyte containing ferric iron with the high grade copper concentrate and then with sulphur dioxide, then again electrolyzing the solution to deposit more copper, repeating the cycle until the high grade copper concentrate is impoverished in copper, then roasting the impoverished high grade copper concentrate and leaching it to extract the remaining copper.

10. A process of treating mixed oxide and sulphide ore of copper comprising, grinding the ore wet, applying sulphur dioxide to the resulting ore pulp to extract some of the copper, separating a portion of the dissolved copper from the resulting leached residue, precipitating another portion of the dissolved copper in the leached residue as the sulphide, then subjecting the leached residue to flotation to extract the sulphide precipitate and the natural sulphide of the ore.

11. A process of treating copper ore containing oxides and sulphides comprising, grinding the ore wet, applying sulphur dioxide to the resulting ore pulp to extract some of the copper, separating a portion of the dissolved copper from the leached residue, precipitating another portion of the copper in the leached residue, then subjecting the leached residue to flotation to extract the sulphide precipitate and the natural sulphide of the ore as a copper concentrate, separating the copper concentrate into a high grade and a low grade concentrate, roasting the low grade concentrate, leaching the roasted low grade concentrate with an acid solution to extract the copper, electrolyzing the resulting copper solution containing salts of iron to deposit the copper and regenerate acid and ferric iron, treating the electrolyte with the high grade copper concentrate to reduce ferric iron to the ferrous condition, and then again electrolyzing the solution to deposit more copper.

12. A process of treating copper ore containing oxides and sulphides comprising, applying sulphur dioxide to the finely ground ore pulp to extract a portion of the copper, then applying a dilute acid solution to the ore pulp to dissolve another portion of the copper, separating a portion of the dissolved copper from the leached residue, precipitating another portion of the dissolved copper in the leached residue, then subjecting the leached residue to flotation to extract the precipitate and the natural sulphide of the ore.

13. A copper extraction process comprising, leaching copper ore with an acid solution to extract the copper, electrolyzing the resulting copper solution containing salts of iron to deposit the copper and regenerate acid and ferric iron, treating the electrolyzed solution containing ferric iron with concentrated copper sulphide and then with sulphur dioxide, again electrolyzing the solution and repeating the cycle until the concentrated copper sulphide becomes impoverished in copper, then roasting the concentrated copper sulphide residue, and leaching the roasted residue to extract the copper therefrom.

14. A process of treating copper ore containing oxides and sulphides comprising, leaching the ore with a dilute acid solution to dissolve a portion of the copper, separating a portion of the dissolved copper from the leach residue, precipitating another portion of the dissolved copper in the leach residue as the sulphide, then subjecting the leached residue to flotation to extract the sulphide precipitate and the natural sulphide of the ore, separating the resulting sulphide concentrate into a high grade and a low grade concentrate, roasting the low grade concentrate, leaching the roasted low grade concentrate with a dilute acid solution to extract the copper, electrolyzing the resulting copper solution containing salts of iron to deposit the copper and regenerate acid and ferric iron, fusing the high grade concentrate to dissociate sulphur and still further concentrating the high grade concentrate, applying the fused sulphide concentrate to the electrolyte to reduce ferric iron formed by the electrolysis to the ferrous condition, combining the dissociated sulphur from fusing the high grade concentrate with some other element to form a precipitant for copper, and applying the precipitant to the leached ore to precipitate the portion of the dissolved copper in the leached ore residue.

15. A process of treating copper ore comprising, concentrating the ore to separate a sulphide concentrate from the gangue, fusing the resulting concentrate to still further concentrate it in copper and slag off impurities, subdividing the resulting fused sulphide concentrate, treating the subdivided concentrate with ferric iron solution to dissolve copper with the simultaneous reduction of the ferric iron to the ferrous condition, electrolyzing the resulting copper solution containing salts of iron to deposit the copper and regenerate ferric iron, returning the regenerated ferric iron solution to the subdivided sulphide concentrate, and repeating the cycle.

16. A process of treating copper ore comprising, concentrating the ore to separate a sulphide concentrate from the gangue, roasting a portion of the concentrate, fusing another portion of the concentrate to still further concentrate it in copper and slag off impurities, subdividing the resulting fused sulphide concentrate, treating the subdivided sulphide concentrate with a ferric salt solution to dissolve the copper with the simultaneous reduction of ferric iron to ferrous iron, electrolyzing the resulting copper solution containing salts of iron to deposit the copper and regenerate ferric iron, returning the regenerated ferric iron solution to the sulphide concentrate and repeating the cycle, and controlling the solution by treating it with the roasted concentrate.

17. A process of treating mixed oxide and sulphide ores of copper comprising, grinding the ore wet, applying a gaseous reagent to the resulting ore pulp to dissolve some of the copper, separating a portion of the dissolved copper from the resulting leached residue, precipitating another portion of the dissolved copper in the leached residue, then subjecting the leached residue to flotation to recover the precipitate and the natural sulphide in the ore.

18. A process of treating copper ore comprising, concentrating the ore to obtain a high grade and a low grade sulphide concentrate, roasting the low grade concentrate, treating the high grade sulphide concentrate with a ferric salt solution to dissolve the copper with the simultaneous reduction of ferric iron to ferrous iron, electrolyzing the resulting copper solution containing salts of iron with carbon anodes to deposit the copper and regenerate ferric iron, returning the regenerated ferric iron solution to the sulphide concentrate, controlling the acidity and iron content of the solution by treating it with the roasted concentrate, and maintaining the temperature of the solution above the temperature normally due to atmospheric conditions or to heat generated by chemical reactions involved in the process.

19. A process of treating copper ore comprising, concentrating the ore to obtain a sulphide concentrate, roasting a portion of the concentrate, treating another portion of the concentrate with a ferric salt solution to dissolve the copper with the simultaneous reduction of ferric iron to ferrous iron, electrolyzing the resulting copper solution containing salts of iron to deposit the copper and regenerate ferric iron, returning the regenerated ferric iron solution to the sulphide concentrate, regulating the solution by treating it with the roasted concentrate, and maintaining the temperature of the solution above the temperature normally due to atmospheric conditions or to heat generated by chemical reaction involved in the process.

20. A process of treating concentrated copper sulphide comprising, treating the sulphide concentrate with a ferric salt solution to dissolve the copper with the simultaneous reduction of ferric iron to ferrous iron, electrolyzing the resulting copper solution containing salts of iron with carbon anodes to deposit the copper and regenerate ferric iron, returning the regenerated ferric iron solution to the sulphide concentrate and repeating the cycle, and maintaining the temperature of the solution above the temperature normally due to atmospheric conditions or to heat generated by chemical reactions involved in the process.

21. A process of treating copper ore containing oxides and sulphides comprising, leaching the ore with a dilute acid solution to dissolve a portion of the copper, separating a portion of the dissolved copper from the leached residue, precipitating another portion of the copper in the leached residue as the sulphide, then subjecting the leached residue to flotation to recover the sulphide precipitate and the natural sulphide of the ore, separating the resulting sulphide concentrate into a high grade and a low grade concentrate, roasting the low grade concentrate, leaching the roasted low grade concentrate with a dilute acid solution to extract the copper, fusing the high grade concentrate to dissociate sulphur and still further concentrate the high grade concentrate, combining the dissociated sulphur with hydrogen to form hydrogen sulphide, and applying the hydrogen sulphide to precipitate the portion of the soluble copper remaining in the leached ore residue.

22. A process of treating copper ore comprising, leaching the ore to extract the copper, electrolyzing the resulting copper solution to deposit the copper and regenerate acid and ferric iron, fusing a high grade copper sulphide concentrate to dissociate sulphur and still further concentrate the high grade copper concentrate, applying the fused copper concentrate to the electrolyte to reduce ferric iron formed by the electrolysis to the ferrous condition, combining the dissociated sulphur with some other element to form a precipitant for copper, and applying the copper precipitant to lean and foul copper solutions to precipitate the copper therefrom.

WILLIAM E. GREENAWALT.